March 18, 1969     D. R. KERSTETTER     3,432,900

METHOD OF MAKING A PENCIL TYPE INDIRECTLY HEATED CATHODE

Original Filed Aug. 17, 1964

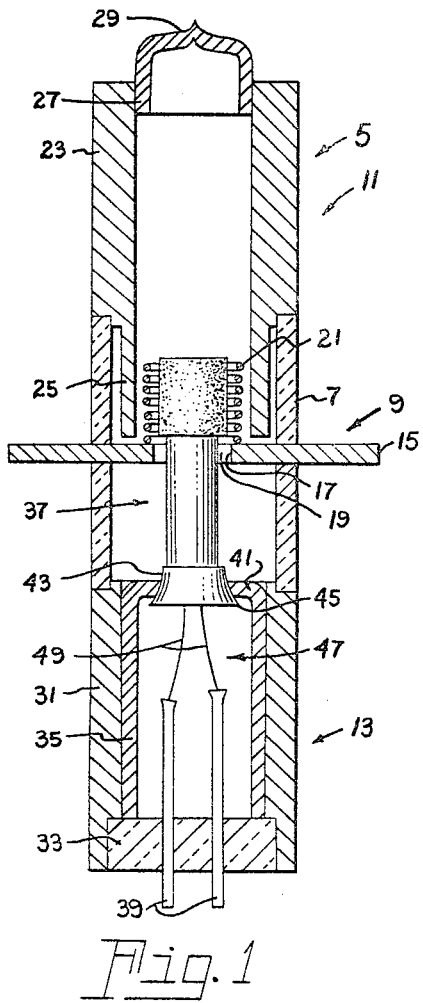

Fig. 1

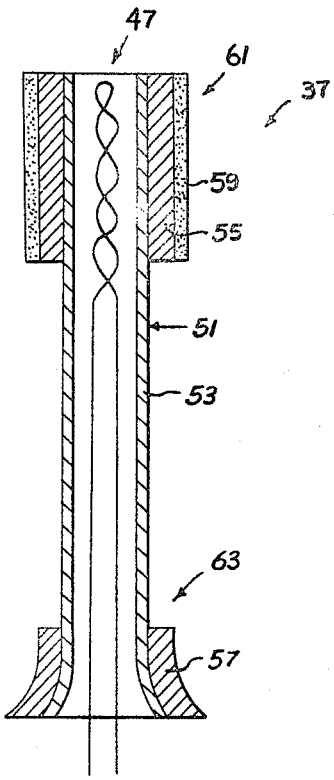

Fig. 2

```
BOND AN OUTER METAL LAMINA TO
A SEAMLESS METAL TUBE TO
PROVIDE A LAMINATED METAL CORE

COAT SELECTED PORTIONS OF OUTER
LAMINA WITH ACID INSOLUBLE LAYER

IMMERSE CORE IN ACID BATH TO
DISSOLVE UNCOATED OUTER LAMINA

IMMERSE CORE IN SOLVENT BATH
TO REMOVE ACID INSOLUBLE LAYER

APPLY POTENTIALLY EMISSIVE
MATERIALS TO OUTER METAL LAMINA
```

Fig. 3

INVENTOR.
DONALD R. KERSTETTER

BY *Cyril A. Kunzer*

ATTORNEY

United States Patent Office 3,432,900
Patented Mar. 18, 1969

3,432,900
METHOD OF MAKING A PENCIL TYPE INDIRECTLY HEATED CATHODE
Donald R. Kerstetter, Emporium, Pa., assignor to Sylvania Electric Products Inc., a corporation of Delaware
Application Feb. 27, 1967, Ser. No. 619,073, which is a continuation of application Ser. No. 390,079, Aug. 17, 1964. Divided and this application Apr. 4, 1968, Ser. No. 718,889
U.S. Cl. 29—25.17    5 Claims
Int. Cl. H01j 9/00; C23f 1/00

ABSTRACT OF THE DISCLOSURE

A cathode support structure suitable for use in an indirectly heated electron discharge device is produced by bonding a first layer of nickel alloy metal to a seamless metal tube, then portions of said first layer are removed by masking and etching, and an emissive second layer is coated onto desired remaining areas of said first layer.

---

This application is a divisional application of Ser. No. 619,073, filed Feb. 27, 1967, which is a continuation of Ser. No. 390,079, filed Aug. 17, 1964, now abandoned which is assigned to the assignee of the present invention.

This invention relates to an integral cathode and support structure and a process for fabricating such structures and more particularly to an integral cathode and support structure suitable for use in an indirectly heated electron discharge device and fabricated from a laminated metal core.

The known "pencil" type electron discharge devices include a cathode and support structure which is essentially a pair of co-axially aligned sleeve joined together at one end with the opposite end of the support attached to and upheld by a support member. The cathode is usually a metal sleeve of a material having high heat conductivity, good weldability to other metals, and good emission effects on potentially emissive materials while the support is a metal sleeve of a material having low heat conductivity, poor weldability to other metals, and poor emission effects on potentially emissive materials.

Although such cathode and support structures have enhanced the fabrication of "pencil" type discharge devices, it has been found that the structure leaves much to be desired because of certain inherent characteristics. For example, the purpose of the support sleeve is to properly locate and uphold the cathode sleeve which necessitates a material having good mechanical strength and rigidity. Also, the support sleeve should have a low heat conductivity and a minimum wall thickness, consistent with the desired rigidity and strength, in order to prevent undue drainage of heat from the cathode sleeve. Further, the support sleeve should have good weldability to other metals in order to facilitate the attachment thereof to a support member and to the cathode sleeve.

However, it has been found impractical to fabricate a seamless support structure from material having the above-described characteristics because of the necessity of having a very thin-walled structure in order to prevent the above-mentioned drainage of heat from the cathode structure. As a result, the known support sleeves have a welded seam whereat the material thickness is doubled and which tends to cause an uneven distribution of heat and inherent warpage of the structure.

Also, the cathode and support structure are usually affixed by telescoping the end of one sleeve over the end of another and welding the sleeves together. It has been found that the thinness of the wall of the support sleeve is again limited because of the need for sufficient material to permit a welding operation. Further, the seam in the support sleeve complicates the welding process; and more importantly, the process is expensive and obtaining a true co-axial alignment of the support and cathode sleeves is not only difficult but also impractical.

Additionally, the burrs and slivers inherent to a welding process present a multitude of problems to an operator attempting to insert a heater into a co-axially aligned and welded cathode and support structure. Moreover, the attachment of the prior known support structure to a support member requires vacuum conditions in order to provide a reliable jointure, and such a requirement is obviously expensive and inconvenient in both apparatus and labor.

Therefore, it is an object of this invention to provide an improved integral cathode and support structure for an indirectly heated electron discharge device.

Another object of the invention is to enhance the co-axial alignment of a cathode and support structure suitable for use in an indirectly heated electron discharge device.

Still another object of the invention is to improve the means for attaching an integral cathode and support structure to a support member.

A further object of the invention is to facilitate the loading of a heater into a cathode and support structure.

A still further object of the invention is to provide an improved integral cathode and support structure fabricated from a laminated core.

An additional object of the invention is to provide a process for fabricating an improved integral cathode and support structure from a laminated core.

These and other objects are achieved in one aspect of the invention by a laminated metal core having a tubular inner lamina and an outer lamina bonded thereto. The outer lamina has spaced first and second portions with a layer of potentially emissive material adhered to the first portion and the second portion formed for attachment to a support member. In the fabrication process a tubular inner lamina is clad with a metal outer lamina to provide a laminated core. The laminated core is fabricated into an integral cathode and support by masking a portion of the outer lamina, etching away the unmasked outer lamina, removing the masking, and applying a layer of potentially emissive materials to a portion of the remaining outer lamina.

For a better understanding of the present invention, together with other and further objects, advantages, and capabilities thereof, reference is made to the following disclosure and appended claims in connection with the accompanying drawings in which:

FIG. 1 is an elevational view of a "pencil" type electron discharge device wherein is included an integral cathode and support structure;

FIG. 2 is an enlarged elevational view of the integral cathode and support structure of FIG. 1; and FIG. 3 is a flow chart illustrating a process for fabricating the integral cathode and support structure of FIG. 2.

Referring to the drawings, FIG. 1 illustrates a "pencil" type electron discharge device 5. The device 5 includes an insulator 7, of a material such as glass, for example, a grid electrode assembly 9 sealed into and passing through the insulator, a tubular metal anode assembly 11 sealed to one end thereof, and a tubular metal cathode assembly 13 sealed to the opposite end of the insulator 7.

The grid electrode assembly 9 includes a disc 15 of a metal such as silver-plated copper which is hermetically sealed to and passes through the insulator 7. The disc 15 has an annular wall 17 defining a central aperture 19 and a cylindrical-shaped grid 21 is attached at one end to the wall 17 of the disc 15 and extends upwardly therefrom. Thus, the disc 15 which extends outwardly from the insulator 7 provides a readily available means for external electrical connection to grid 21.

The anode assembly 9 includes a tubular metal anode electrode 23 hermetically sealed to one end of the insulator 7 and an off-set section 25 surrounding the grid 21 and longitudinally limited by the disc 15. Also, an exhaust tubulation 27 of a material such as copper is disposed and sealed within the electrode 23 to provide a means for evacuating the discharge device 5. This tubulation 27 is subsequently "pinched off" at a point 29 to effect a hermetic seal after the above-mentioned evacuation of the discharge device 5 has been provided.

The cathode assembly 13 includes a tubular metal cylinder 31, a glass stem member 33, a metal sleeve 35, and an integral cathode and support structure 37. The metal cylinder 31 has one end thereof hermetically sealed to one end of the insulator 7 and the opposite end of the cylinder 31 is hermetically sealed by the stem member 33 sealed thereto and disposed therein.

The glass stem member 33 includes a plurality of electrical conductors 39 sealed therein and extending therethrough to provide a convenient means for connecting an external electrical source to elements within the discharge device 5. Also, metal sleeve 35 is located within and frictionally engages the tubular metal cylinder 31 and in co-axial alignment with the stem member 33. The sleeve 35 includes an end member 41 having an annular wall 43 defining a central aperture 45.

Upheld by the sleeve 35 is an integral cathode and support structure 37 of the type commonly referred to in the electron tube art as an indirectly heated cathode. The structure 37 has one end thereof fixedly attached to the annular wall 43 of the end member 41 and extends upwardly through the aperture 45 and through the central aperture 19 of the disc 15 and within the grid 21 of the grid electrode assembly 9. As is common for indirectly heated cathodes, an insulator covered heater 47 is disposed within and extends from the structure 37. The heater 47 has a pair of legs 49 whereon the insulation has not been included or, if included has been removed, and these legs 49 are welded or attached in some manner to the conductors 39 of the stem member 33 to permit external electrical energization of the heater 47.

As more clearly illustrated in the exploded view of FIG. 2, the integral cathode and support structure 37 includes a laminated metal core 51 having a continuous tubular metal sleeve 53, also referred to as the inner lamina, and spaced first and second outer metal lamina portions 55 and 57 bonded thereto. The first outer metal lamina portion 55 has a layer 59 of potentially emissive materials surrounding and adhered thereto and the second outer metal lamina portion 57 is bonded to the sleeve 53 and formed into a flared configuration as will be explained hereinafter.

The metal sleeve 53 with the first outer metal lamina portion 55 bonded thereto and the layer 59 of potentially emissive materials adhered to the lamina portion 55 forms a cathode section 61. Also, the metal sleeve 53 with the second lamina portion 57 bonded thereto forms a support section 63. Moreover, the heater 47 is designed and disposed within the metal core 51 in a manner such that a major portion of the energy therefrom is available at the cathode section 61.

As to materials, the tubular metal sleeve 53 or inner lamina is of a material having low heat conductivity, high mechanical strength, poor attachability to other metals, poor emission effects on potentially emissive materials, and poor solubility in an acid bath. For example, a material having a nickel to chromium ratio of about 80:20, such as "Tophet A" available from the W. B. Driver Company of Newark, N.J., or "Nichrome 5" available from the Driver Harris Company of Harrison, N.J., is preferred. However, other materials are equally applicable and appropriate so long as the above-mentioned characteristics are either present or readily obtainable.

The first and second outer metal lamina portions 55 and 57 are of a material having a relatively high heat conductivity, a relatively low mechanical strength, a relatively good attachability to other metals, a relatively good emission effect upon potentially emissive materials, and a relatively good solubility in an acid bath. Thus, nickel metals and alloys are a preferred material for the outer lamina portions 55 and 57 although other metals having the above-enumerated desirable characteristics are equally applicable and appropriate.

Additionally, the layer 59 of potentially emissive materials may be any one or a combination of materials normally used to provide a source of electrons for electron discharge devices. For example, a preferred material is a mixture of alkaline earth carbonates suspended in a suitable volatile binder and adhered to the first outer lamina portion 55 by any of a number of methods well known in the art.

As to the reason for the previously mentioned flared portion of the metal sleeve 53 and second outer lamina portion 57, it is to be noted that the outer lamina portion 57 is of a material having good attachability to other metals. Thus, this attachability feature provides a convenient means for fixedly attaching and upholding the integral cathode and support structure 37. For example, the structure 37 may be threaded through the aperture 45 of the end member 41 until the second outer lamina portion 57 is brought into contact with the annual wall 43 of the end member 41. Thereupon, a welding electrode is brought into contact with the flared end of the sleeve 53 whereby the outer lamina portion 57 is fixedly attached to the wall 43 of the end member 41 at a minimum of cost, apparatus, and inconvenience.

Referring to the flow chart of FIG. 3, there is illustrated a preferred process for fabricating the above-described integral cathode and support structure 37. Therein, a continuous tube or inner lamina of seamless material having the characteristics of the previously described metal sleeve 53 has bonded thereto by cladding, plating, or any one of numerous well-known techniques for bonding metals, an outer lamina of a material having the characteristics of the above-mentioned first and second spaced outer lamina portions 55 and 57. Then the continuous tube of seamless material and the bonded outer lamina are drawn to a desired diametrical dimension and wall thickness, cut to a desired length, and flared at one end in a manner well known in the art.

A portion of the outer metal lamina is then masked with a coating which is insoluble in an acid bath and the structure immersed in the acid bath. Therein, the unmasked portion of the outer lamina is dissolved to provide the spaced first and second outer lamina portions 55 and 57 and the seamless tube 53 is substantially unaffected.

Thereafter, the structure is immersed in a solvent bath wherein the coating, which served as a mask for the outer lamina in the acid bath, is removed. As a result, there is provided a seamless and continuous tubular sleeve 53 having spaced first and second outer lamina portions 55 and 57 bonded thereto. Following, a layer 59 of potentially emissive materials is adhered to the first outer lamina portion 55 in a manner well known in the art for adhering potentially emissive materials.

As a specific example of the fabrication of an integral cathode and support structure 37, a continuous tube of seamless material known as "Tophet A" and having a nickel-chromium ratio of 80:20 was clad with an ordinary nickel alloy commonly used as cathode material in electron discharge devices. The tube and alloy were drawn, in an ordinary manner, to a diameter of about 45 mils and the alloy had a thickness of about 1.5 mils. Obviously, the thickness of the tube and of the outer lamina may be varied to suit the ultimate use of the structure, and a tube or inner lamina thickness in the range of about 0.2 to 1.0 mil with an outer lamina thickness in the range of about 0.5 to 2.5 mils is preferred for integral cathode and support structures suitable for use in electron discharge devices.

A portion of the outer lamina was masked with a coating usually referred to as a "stop-off" lacquer, as for example Rack Coating 218X available from the United Chromium Division of the Metals & Thermite Corporation of Carteret, N.J. Then the tube and bonded outer lamina with the adhered coating thereon was immersed in an acid bath, such as a 20% nitric acid bath for instance, wherein that portion of the outer lamina not covered by the coating was dissolved.

Thereafter, the tube and bonded outer lamina with the adherent coating thereon was immersed in a solvent for the coating, acetone in this example, wherein the coating was removed and there remained the tubular sleeve 53 and the spaced first and second outer lamina portions 55 and 57 bonded thereto. Following, a layer 59 of potentially emissive materials, such as a mixture of alkaline earth carbonates suspended in a volatile binder, was adhered to the first outer lamina portion 45 in a manner well known in the art to provide an integral cathode and support structure 37.

It is to be noted that the integral cathode and support structure 37 fabricated in accordance with the above-described method has numerous advantages which heretofore have been unobtainable. For example, the application of an outer lamina to a seamless inner lamina and the drawing of this laminated core to a desired diametrical size having a wall thickness which includes a predetermined inner lamina and outer lamina thickness ratio is believed to be unobtainable by any other process.

Further, warpage of the support structure due to unevenly distributed heat therein caused by the double seam thickness is virtually eliminated by the above-described seamless structure. Moreover, the provision of an integral cathode and support structure has permitted a reduction in the wall thickness of the support by eliminating the necessity of a welded jointure therebetween. Also, the elimination of the weld jointure has not only enhanced the co-axial alignment of the cathode and support structure but also practically eliminated the problems previously encountered in attempting to insert a heater within the structure.

Additionally, the integral cathode and support structure has not only reduced the number of parts on inventory, the cost of assembly, and the apparatus required for assembly, but also has increased the reliability and reduced the cost of attaching the support structure to a support member by providing thereon an outer lamina having good weldability to other metals and specifically formed for ease of attachment to a support member.

While there has been shown and described what is at present considered the preferred embodiment of the invention, it will be obvious to those skilled in the art that various changes and modifications may be made therein without departing from the invention as defined by the appended claims.

I claim:
1. A process for fabricating an integral cathode and support structure suitable for use in an indirectly heated electron discharge device comprising the steps of:
bonding an outer metal lamina of acid soluble material to a seamless metal sleeve of acid insoluble material to provide a laminated metal core;
applying a layer of acid insoluble material to selected portions of said outer lamina;
immersing said laminated core in an acid bath to remove said outer lamina not covered by said layer of acid insoluble material;
immersing said laminated core in a solvent for said layer of acid insoluble material; and
adhering a layer of potentially emissive materials to said outer lamina.
2. The process of claim 1 including the steps of:
reducing the diametrical size and wall thickness of said laminated metal core;
cutting said laminated core into lengths and flaring one end of each of said lengths.
3. The process of claim 1 wherein said outer metal lamina is of a material characterized by relatively high heat conductivity, low mechanical strength, good attachability to other metals, good emission effect on potentially emissive materials, and good solubility in an acid bath and said seamless metal sleeve is of a material characterized by relatively low heat conductivity, high mechanical strength, poor attachability to other metals, poor emission effects on potentially emissive materials, and poor solubility in an acid bath.
4. The process of claim 1 wherein said seamless metal sleeve is a metal alloy having a nickel-chromium ratio of about 80:20, and said outer metal lamina is an alloy of nickel commonly used as cathode material in electron discharge devices.
5. The process of claim 1 wherein said seamless metal sleeve has a thickness in the range of about 0.2 to 1.0 mil and said outer lamina has a thickness in the range of about 0.5 to 2.5 mils.

References Cited

UNITED STATES PATENTS

| | | | |
|---|---|---|---|
| 1,972,162 | 9/1934 | Parrott | 29—25.17 XR |
| 2,843,517 | 7/1958 | Kerstetter | 29—25.17 XR |
| 2,878,409 | 3/1959 | Levi | 29—25.17 XR |
| 3,056,061 | 9/1962 | Melsert | 29—25.17 XR |
| 3,088,851 | 5/1963 | Lemmens et al. | 29—25.17 XR |

FOREIGN PATENTS 794,154   4/1958   England.

JOHN F. CAMPBELL, *Primary Examiner.*

R. B. LAZARUS, *Assistant Examiner.*

U.S. Cl. X.R.

156—3